(12) United States Patent
Dechant et al.

(10) Patent No.: US 9,303,679 B2
(45) Date of Patent: Apr. 5, 2016

(54) FASTENER RETAINER

(75) Inventors: Daniel A. Dechant, Glenview, IL (US);
Jason D. Holt, Glenview, IL (US);
Robert R. Schaser, Glenview, IL (US);
Glenn G. Heavens, Glenview, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 45 days.

(21) Appl. No.: 14/232,267

(22) PCT Filed: Jul. 11, 2012

(86) PCT No.: PCT/US2012/046162
§ 371 (c)(1),
(2), (4) Date: Jan. 11, 2014

(87) PCT Pub. No.: WO2013/009804
PCT Pub. Date: Jan. 17, 2013

(65) Prior Publication Data
US 2014/0161562 A1    Jun. 12, 2014

Related U.S. Application Data

(60) Provisional application No. 61/506,705, filed on Jul. 12, 2011.

(51) Int. Cl.
*F16B 41/00* (2006.01)
*F16B 19/02* (2006.01)
(Continued)

(52) U.S. Cl.
CPC .............. *F16B 41/00* (2013.01); *F16B 19/02* (2013.01); *F16B 37/0842* (2013.01); *F16B 41/002* (2013.01); *F16B 5/025* (2013.01); *F16B 5/0258* (2013.01); *F16B 5/065* (2013.01)

(58) Field of Classification Search
CPC ...... F16B 41/002; F16B 43/00; F16B 5/0258; F16B 5/0241
USPC .......................................... 411/999, 546, 353
See application file for complete search history.

(56) References Cited

U.S. PATENT DOCUMENTS 2,972,367 A * 2/1961 Wootton ....................... 411/350
4,306,708 A * 12/1981 Gassaway et al. ......... 267/141.3
(Continued)

FOREIGN PATENT DOCUMENTS

CN    1204013 A    1/1999
CN    1212340 A    3/1999
(Continued)

OTHER PUBLICATIONS

ISR and WO for PCT/US2012/046162 mailed Oct. 15, 2012.

*Primary Examiner* — Flemming Saether
(74) *Attorney, Agent, or Firm* — Joseph M. Butscher; The Small Patent Law Group, LLC

(57) ABSTRACT

A single retainer is configured to securely retain a fastener and first and second limiting members. The retainer may include a main body, fastener-engaging members extending from the main body, and limiter-engaging members from the main body. The fastener-engaging members are configured to securely engage a portion of the fastener, and the limiter-engaging members are configured to securely engage portions of the first and second limiting members. The fastener-engaging members and the limiter-engaging members are configured to retain the fastener and the first and second limiting members.

12 Claims, 4 Drawing Sheets

(51) Int. Cl.
*F16B 37/08* (2006.01)
*F16B 5/02* (2006.01)
*F16B 5/06* (2006.01)

(56) References Cited

U.S. PATENT DOCUMENTS

| | | | | |
|---|---|---|---|---|
| 4,585,366 | A | * | 4/1986 | Uchida ............................ 403/21 |
| 4,979,858 | A | | 12/1990 | Van Allman |
| 5,395,194 | A | | 3/1995 | Johnson |
| 5,527,073 | A | * | 6/1996 | Readman ...................... 285/340 |
| 5,662,444 | A | * | 9/1997 | Schmidt, Jr. .......... F16B 41/002 |
| | | | | 411/353 |
| 5,807,052 | A | | 9/1998 | Van Boven et al. |
| 5,871,319 | A | * | 2/1999 | Schneider ..................... 411/107 |
| RE36,164 | E | | 3/1999 | Johnson |
| 6,059,503 | A | | 5/2000 | Johnson |
| 6,174,118 | B1 | * | 1/2001 | Rebers ................. F16B 37/041 |
| | | | | 411/107 |
| 6,227,784 | B1 | * | 5/2001 | Antoine ................. F02B 77/00 |
| | | | | 411/11 |
| 6,280,132 | B1 | | 8/2001 | Szczukowski et al. |
| 7,775,819 | B2 | * | 8/2010 | Bader et al. .................... 439/212 |
| 2003/0108401 | A1 | * | 6/2003 | Agha et al. ..................... 411/353 |
| 2004/0062621 | A1 | * | 4/2004 | Jiang ..................... F16B 5/0208 |
| | | | | 411/353 |
| 2008/0075403 | A1 | | 3/2008 | Holt |
| 2008/0145180 | A1 | * | 6/2008 | Hermann et al. ............. 411/378 |
| 2009/0110478 | A1 | | 4/2009 | Schneider |
| 2011/0286813 | A1 | | 11/2011 | Szczukowski |
| 2013/0071203 | A1 | * | 3/2013 | Hay ............................... 411/111 |
| 2013/0164094 | A1 | * | 6/2013 | Kammerer .................... 411/337 |

FOREIGN PATENT DOCUMENTS

| | | |
|---|---|---|
| DE | 10259976 A1 | 7/2004 |
| DE | 102007036349 A1 | 2/2008 |
| DE | 102009016633 A1 | 5/2010 |
| DE | 102010045833 A1 | 4/2011 |
| EP | 1764516 A2 | 3/2007 |
| FR | 2857761 A1 | 1/2005 |

* cited by examiner

FASTENER RETAINER

RELATED APPLICATIONS

This application is National Phase of PCT/US2012/046162 filed Jul. 11, 2012 and claims priority benefits from U.S. Provisional Patent Application No. 61/506,705 filed Jul. 12, 2011.

FIELD OF EMBODIMENTS OF THE INVENTION

Embodiments generally relate to a fastener assembly, and more particularly, to a fastener assembly having a retainer that securely retains and captures a fastener and multiple compression limiters.

BACKGROUND

Fasteners are used to secure component parts together. For example, in automotive applications, various fasteners are used to secure panels, plates, and the like, to a vehicle frame.

In various applications, a fastener is retained within a compression limiter sleeve that is disposed between a shaft of the fastener and a bracket. A compression limiter is used to apply load to an isolator. Compression limiters limit the amount of compression that can be applied to an isolator. The compression limiter sleeve typically includes terminal flanges or collars. Isolating rings are often compressively sandwiched between each flange or collar and the bracket. Additionally, retainers are often disposed between an interior wall of the limiter sleeve and an outer shaft of the fastener. Typically, each retainer is able to securely capture the fastener and one other component. Thus, a typical limiter sleeve has multiple internally-spaced retainers that are configured to capture the fastener at multiple locations within the limiter sleeve.

The retainers are typically press fit into the fastener. If the force of the press fit is not strong enough, however, the fastener may undesirably shift with respect to the retainers and the limiter sleeve.

Additionally, as can be appreciated, the use of multiple retainers within a limiter sleeve adds material cost. Further, the process of assembling separate and distinct retainers within the limiter sleeve may be time-consuming and labor-intensive.

SUMMARY OF EMBODIMENTS OF THE INVENTION

Certain embodiments provide a single retainer configured to securely retain a fastener and first and second limiting members. The retainer may include a main body, fastener-engaging members, and limiter-engaging members.

The fastener-engaging members extend from the main body and are configured to securely engage a portion of the fastener. The limiter-engaging members also extend from the main body, and are configured to securely engage portions of the first and second limiting members. The fastener-engaging members and the limiter-engaging members are configured to retain the fastener and the first and second limiting members.

The fastener-engaging members may each include fastener-engaging walls between terminal ends of the main body. Alternatively, the fastener-engaging members may each include inwardly-directed prongs extending from terminal ends of the main body. The inwardly-directed prongs may be configured to wedge between threads of the fastener. The inwardly-directed prongs may provide a ratcheting mechanism with respect to the fastener.

The limiter-engaging members may include outwardly-extending rims extending from terminal ends of the main body. Alternatively, the limiter-engaging members may include outwardly-extending prongs extending from terminal ends of the main body. The outwardly-extending prongs may include flat engaging surfaces configured to engage engagement surfaces of the first and second limiting members.

The main body may include one or more slots. The slot(s) are configured to provide flexibility to the retainer. The slots may include a first slot formed through a first rim at a first end of the main body, and a second slot formed through a second rim at a second end of the main body. The first slot may extend toward the second rim, while the second slot may extend toward the first rim.

The first rim may include a first rim segment that bridges first and second fastener-engaging walls. The second rim may include a second rim segment that bridges third and fourth fastener-engaging walls.

Certain embodiments provide a fastener assembly configured to secure to a component. The fastener assembly may include a fastener having a head and a shaft, first and second limiting members, and a single retainer. Each of the first and second limiting members may include at least one inwardly-directed protuberance. The single retainer is configured to securely retain the fastener and the first and second limiting members together.

The retainer may include a main body, fastener-engaging members extending from the main body and limiter-engaging members extending from the main body. The fastener-engaging members are configured to securely engage a portion of the fastener. The limiter-engaging members are configured to securely engage the inwardly-directed protuberances of the first and second limiting members. The fastener-engaging members and the limiter-engaging members are configured to retain the fastener and the first and second limiting members together.

Figure 1:
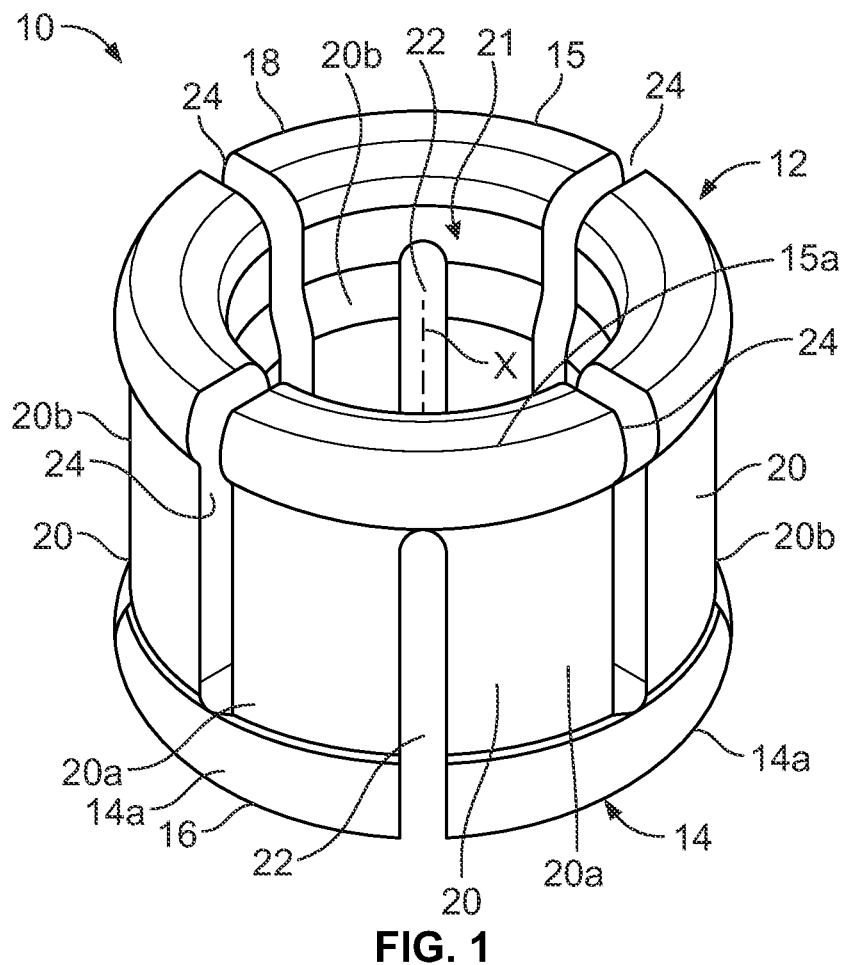
FIG. 1 illustrates an isometric top view of a retainer, according to an embodiment.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE INVENTION

FIG. 1 illustrates an isometric top view of a retainer 10, according to an embodiment. The retainer 10 may be formed as an integral, homogenous piece. For example, the retainer 10 may be a single piece of injection-molded plastic. Alternatively, the retainer 10 may be formed of metal.

The retainer 10 includes a main body 12 having coaxial isolator-engaging-members, such as rims 14 and 15, at opposite ends 16 and 18. The rims 14 and 15 are integrally connected to one another through fastener-engaging members, such as walls 20. A fastener-receiving channel 21 is formed through the main body 12 and is configured to receive a fastener (not shown in FIG. 1). The rims 14 and 15 may be thicker than the walls 20. The rims 14 and 15 may be rolled or folded-over ends of the walls 20. The rims 14 and 15 may be offset away from a central axis X of the retainer 10 with respect to the walls 20. For example, the walls 20 may be closer to the central axis X than the rims 14 and 15.

Each fastener-engaging wall 20 extends between the rims 14 and 15. Slots 22 extending through the rim 14 are formed between neighboring walls 20a. Slots 24 extending through the rim 15 are formed between neighboring walls 20b. Additionally, a slot 24 may be formed between a wall 20a and a wall 20b.

The slots 22 may extend from and through the rim 14 toward the rim 15, while the slots 24 may extend from and through the rim 15 toward the rim 14. The slots 22 may not extend into the rim 15, while the slots 24 may not extend into the rim 15. The slots 22 and 24 may extend into the main body 12 at various lengths. For example, the slots 22 and 24 may extend midway into the main body 12. Optionally, the slots 22 and 24 may extend greater or shorter distances than midway into the main body 12.

The slots 22 and 24 may alternate in a regular, repeating pattern. For example, a slot 22 may be positioned between walls 20a, while a slot 24 may be positioned between a wall 20a and a wall 20b. Optionally, the retainer 10 may include only slots 22 or 24. Additionally, alternatively, the slots 22 and 24 may not alternate in a regular, repeating pattern. Instead, the retainer may include two slots 22 or 24, for example, and four slots 24 or 22, for example. Additionally, alternatively, the retainer 10 may not include any slots 22 or 24. Instead, the retainer 10 may include a contiguous cylindrical main body 12 having the rims 14 and 15 at either ends 16 and 18, respectively. However, the slots 22 and 24 provide flexibility and provide for ease of insertion between limiting members and around a shaft of a fastener, for example.

The rims 14 and 15 may provide bridging portions between the walls 20. For example, rim segment 15a may bridge neighboring walls 20a, while rim segment 14a may bridge neighboring walls 20a and 20b.

The slots 22 and 24 are configured to provide flexibility to the retainer 10. That is, the slots 22 and 24 allow the walls 20 to flex radially toward and away from a central axis X of the retainer 10. The slots 22 and 24 may also allow neighboring walls 20 to pivot toward and away from one another. For example, the rim segments 14a may flex toward and away from one another by way of the walls 20a flexing and pivoting with respect to the bridging rim segment 15a.

The main body 12 may have a generally circular axial cross-section. As such, the main body 12 may have a generally cylindrical shape. Optionally, the main body 12 may have various other shapes and sizes configured to accommodate fasteners of various shapes and sizes, for example.

Figure 2:
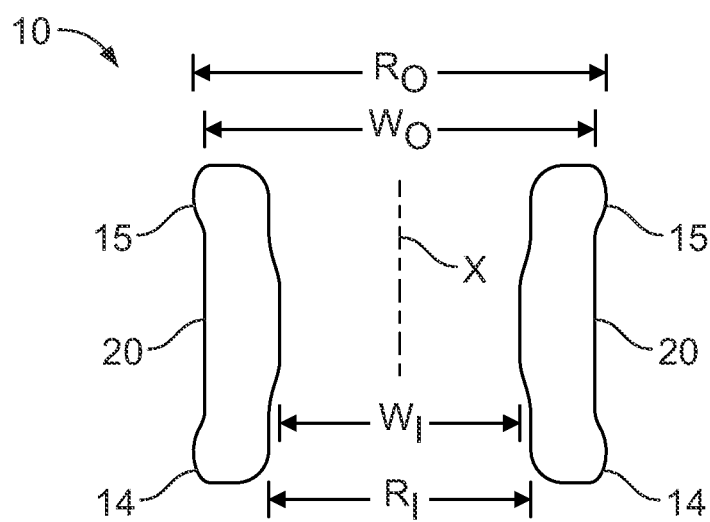
FIG. 2 illustrates a transverse cross-sectional view of a retainer, according to an embodiment.

FIG. 2 illustrates a transverse cross-sectional view of the retainer 10, according to an embodiment. The inner diameter $R_I$ of the rims 14 and 15 may be greater than the inner diameter $W_I$ of the walls 20. The outer diameter $R_O$ of the rims 14 and 15 may be greater than the outer diameter $W_O$ of the walls 20. In this manner, the inner diameter $W_I$ of the walls 20 may be configured to directly contact a shaft of a fastener, while the outer diameter $R_O$ of the rims 14 and 15 may be configured to directly abut into limiting members (not shown in FIG. 2). Alternatively, the inner diameter of the rims 14 and 15 may be the same as the inner diameter of the walls 20.

Figure 3:
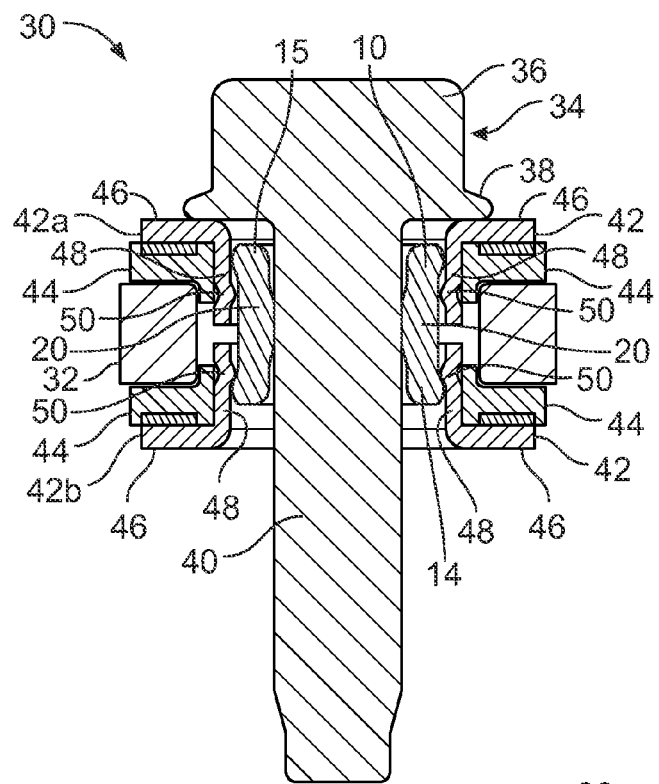
FIG. 3 illustrates a cross-sectional view of a fastener assembly, according to an embodiment.

FIG. 3 illustrates a cross-sectional view of a fastener assembly 30, according to an embodiment. The fastener assembly 30 is configured to securely fasten to a component 32, such as a panel, frame, bracket, or the like. The fastener assembly 30 includes a fastener 34, such as a screw, bolt, or the like. The fastener 34 includes a head 36 integrally formed with a planar flange 38, which, in turn, integrally connects to a shaft 40.

The fastener assembly 30 also includes limiting members 42 that compressively sandwich annular isolators 44 into the component 32. As shown in FIG. 3, the fastener assembly 30 includes two opposed limiting members 42, which may have a circular axial cross-section. Each limiting member 42 includes a planar collar 46 integrally formed with an inboard wall 48, which may be perpendicular to the planar collar 46. Each wall 48 may include an inwardly-directed protuberance 50, such as a cant, ridge, indentation, or the like.

In operation, the fastener 34 is inserted into the fastener-receiving channel 21 of the retainer 10. Outer surfaces of the shaft 40 are engaged and secured between the fastener-engaging walls 20 of the retainer 10. Referring to FIGS. 2 and 3, because the fastener-engaging walls 20 have a smaller inner diameter $W_I$ than the inner diameter $R_I$ of the rims 14 and 15, the fastener-engaging walls 20 securely abut into the shaft 40. Thus, the fastener-engaging walls 20 may securely retain the shaft 40 of the fastener 34. Optionally, the inner diameter of the rims 14 and 15 may be the same as the inner diameter $W_I$ and may therefore also securely engage the outer surface of the shaft 40.

The rims 14 and 15 abut into the inboard walls 48 of the limiting members 42. As shown in FIG. 3, the rim 15 abuts into the inboard wall 48 of the limiting member 42a just above the protuberance 50. As such, the rim 15 effectively latches or snaps onto the limiting member 42a, thereby securing the limiting member 42a in place at the same time the fastener-retaining walls 20 of the retainer 10 securely retains or captures the shaft 40 of the fastener 34. Similarly, the rim 14 abuts into the inboard wall 48 of the limiting member 42b just below the protuberance 50, thereby securing the limiting member 42b in position. As shown in FIG. 3, the retainer 10 retains both limiting members 42a and 42b in position. For example, the retainer 10 may be effectively suspended between the limiting members 42a and 42b by way of the rims 14 and 15 engaging the rims 15 and 14, respectively. At the same time, the retainer 10 securely retains the shaft 40 of the fastener 34. Accordingly, the retainer 10 securely retains or captures the fastener 34, the limiting member 42a, and the limiting member 42b. Unlike previous retaining devices, the retainer 10 is able to retain more than two components at any given time.

During assembly, the rims 14 and 15 may snapably engage the protuberances 50 of the limiting members 42b and 42a, respectively. The snap-fit provides a stronger retaining force than, for example, a press fit.

With respect to the snapable connection, the outer diameters of the rims 14 and 15 are greater than the inner diameters of the protuberances 50. When the limiting members 42a and 42b are urged onto the retainer 10, the rims 14 and 15 may deflect inwardly (which may be facilitated by the slots 22 and 24 shown in FIG. 1), while the protuberances 50 deflect outwardly. When the rims 14 and 15 slide past the protuberances 50, the rims 14 and 15 snap back into their at-rest positions, while the protuberances 50 snap back into their at-rest positions. Consequently, the wider outer diameters of the rims 14 and 15 are prevented from shifting past the protuberances 50, thereby allowing the retainer 10 to securely retain the limiting members 42a and 42b.

The limiting members 42a and 42b compressively sandwich the component between the annular isolators 44. The retainer 10 securely retains or otherwise captures and connects the limiting members 42a and 42b to the fastener 34, which is securely retained by the retainer 10.

Figure 4:
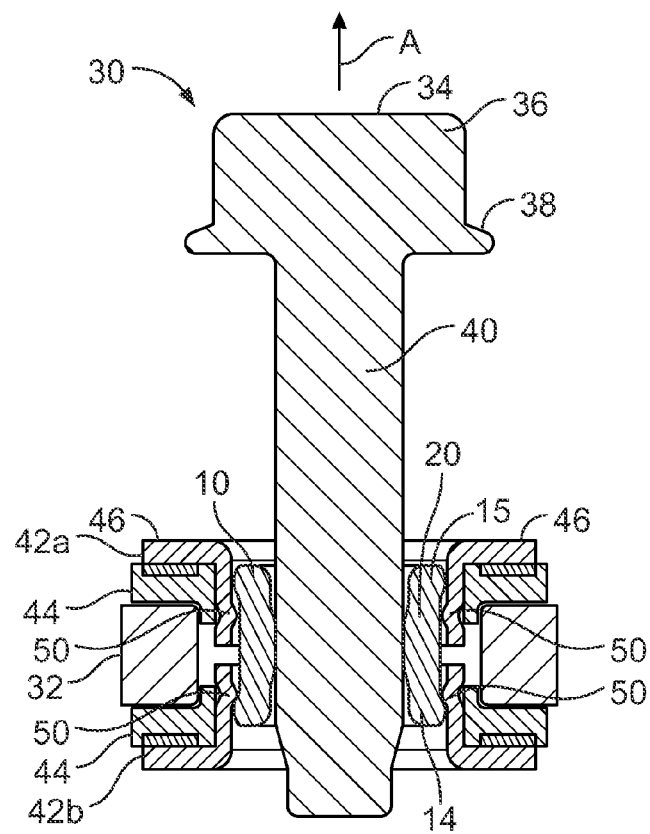
FIG. 4 illustrates a cross-sectional view of a fastener assembly with a fastener being removed from a retainer, according to an embodiment.

FIG. 4 illustrates a cross-sectional view of the fastener assembly 30 with the fastener 34 being removed from the retainer 10, according to an embodiment. As the fastener 34 is moved out of the retainer 10 in the direction of arrow A, the rims 14 and 15 continue to engage the limiting members 42b and 42a, respectively. Accordingly, the retainer continues to ensure that the component 32 is secured between the isolators 44, which are compressed into the component 32 through the limiting members 42a and 42b. Therefore, even when the fastener 34 is removed, the retainer 10 exerts retaining force into the limiting members 42a and 42b, as described above, and holds the limiting members 42a, 42b, the isolators 44, and the component 32 together.

The retainer 10 is configured to retain or capture the limiting members 42a, 42b, and the fastener 34. Additionally, the retainer 10 allows for controlled movement of the fastener 34 (for example, axially in the direction of arrow A) with respect to the retainer 10. Accordingly, the fastener 34 may be retracted out of the way of the limiting members 42a and 42b during assembly.

Figure 5:
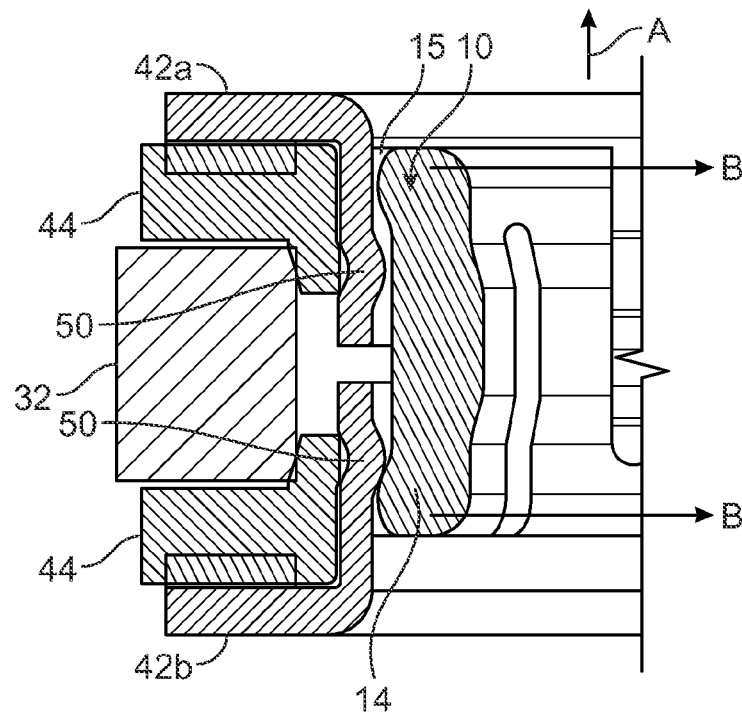
FIG. 5 illustrates a cross-sectional view of a retainer engaging limiting members, according to an embodiment.

FIG. 5 illustrates a cross-sectional view of the retainer 10 engaging the limiting members 42a and 42b, according to an embodiment. The outwardly-protruding rims 15 and 14 are configured to engage the inwardly-extending protuberances 50 of the limiting members 42a and 42b, respectively. As shown in FIG. 5, if the retainer 10 axially shifts upward in the direction of arrow A, the rim 15 may shift upward from the protuberance 15 of the limiting member 42a. However, the rim 14 securely abuts into the protuberance 50 of the limiting member 42b, and prevents the retainer 10 from further shifting relative to the limiting members 42a and 42b. At the same time, the rim 15 provides a barrier past which the protuberance 50 of the limiting member 42a are unable to pass. As such, the retainer 10 ensures that the limiting members 42 and 42b remain connected to one another.

As shown in FIG. 5, when no fastener is present, the rims 14 and 15 are able to flex inwardly in the direction of arrows B.

Figure 6:
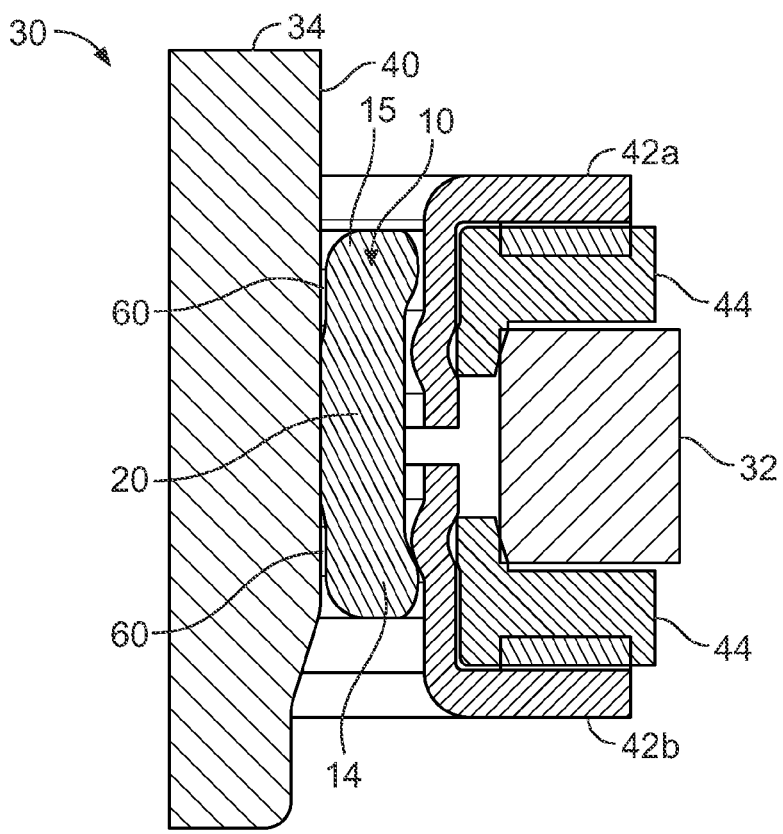
FIG. 6 illustrates a cross-sectional view of a retainer engaging a shaft of a fastener, according to an embodiment.

FIG. 6 illustrates a cross-sectional view of the retainer 10 engaging the shaft 40 of the fastener 34, according to an embodiment. As shown in FIG. 6, the fastener-engaging walls 20 securely engage around the outer surface of the shaft 40 of the fastener 34. Accordingly, the retainer 10 securely retains the fastener 34, while at the same time ensuring that the limiting members 42a and 42b remain connected to one another.

As shown in FIG. 6, when the fastener 34 is retained by the retainer 10, flex clearance areas 60 are minimized or eliminated, thereby limiting the area over which the rims 14 and 15 may inwardly flex. That is, flexing movement of the retainer 10 is restricted by the shaft 40 of the fastener 34. The minimized flexibility when the retainer 10 retains the fastener 34 provides a stronger connection force between the retainer 10, the fastener 34, and the limiting members 42a and 42b. As such, the fastener assembly 30 is not easily pulled apart or otherwise separated into individual pieces. Thus, the retainer 10 may snapably secure to the limiting members 42a and 42b through a relatively low-force snap fit. However, when the fastener 34 is retained by the retainer 10, the force required to remove the limiting members 42a and 42b from the retainer 10 substantially increases.

The fastener 34 is configured to lock the fastener assembly 30 in position. That is, when the fastener 34 is retained within the retainer 10, the flexibility of the retainer 10 is minimized or eliminated. The walls 20 and rims 14 and 15 of the retainer 10 have little to no room to flex. Accordingly, the pieces of the fastener assembly 30 are locked together, which ensures that the fastener assembly 30 may be retained as a single piece during shipment.

Figure 7:
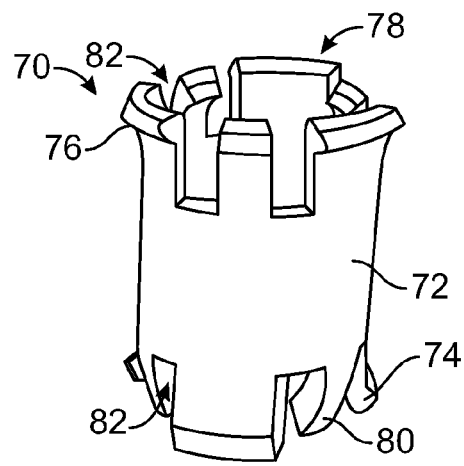
FIG. 7 illustrates an isometric view of a retainer, according to an embodiment.

FIG. 7 illustrates an isometric view of a retainer 70, according to an embodiment. The retainer 70 includes a main body 72 having inwardly-directed fastener-engaging members 74, such as prongs, barbs, clasps, latches, or the like, and outwardly-directed limiter-engaging members 76, such as prongs, barbs, clasps, latches, or the like. The fastener-engaging and limiter-engaging members 74 and 76 extend from opposite ends 78 and 80 of the retainer 70. Slots 82 may be positioned between the fastener-engaging and limiter-engaging members 74 and 76. The slots 82 may extend into the main body 72, similar to the slots 22 and 24 shown and described with respect to FIG. 1. The slots 82 provide flexibility to the retainer 70.

The retainer 70 may be a generally cylindrical structure. However, the retainer 70 may be sized and shaped differently, in order to accommodate fasteners and limiting members of different sizes and shapes.

The retainer 70 may include more or less fastener-engaging and limiter-engaging members 74 and 76 than those shown. For example, the retainer 70 may include four-equally spaced fastener-engaging members 74 at ends 78 and 80, as well as four-equally spaced limiter-engaging members 76 at ends 78 and 80. Optionally, the retainer 70 may include one fastener-engaging member 74 and one limiter-engaging member 76 at both ends 78 and 80.

Figure 8:
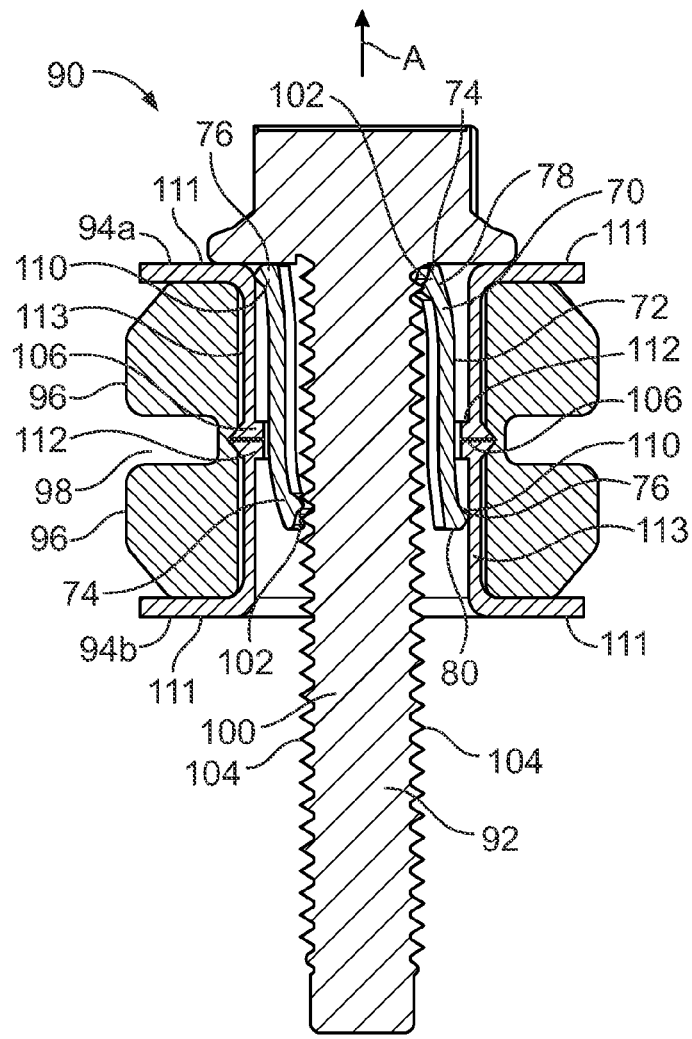
FIG. 8 illustrates a cross-sectional view of a fastener assembly, according to an embodiment.

FIG. 8 illustrates a cross-sectional view of a fastener assembly 90, according to an embodiment. Similar to the fastener assembly 30, the fastener assembly 90 includes a fastener 92 and limiting members 94a and 94b retained by the retainer 70. Isolators 96 may be secured between the opposed limiting members 94a and 94b. A gap 98 may be defined between the isolators 96. The gap 98 is configured to receive an internal edge of a component, such as a bracket (not shown in FIG. 8).

The inwardly-directed fastener-engaging members 74 are configured to abut into a shaft 100 of the fastener 92. The fastener-engaging members 74 may include an angled interface 102 configured to engage threads 104 of the fastener 92. The angled interfaces 102 may conform to the pitch angle of the threads 104. In this manner, the angled interfaces 102 may provide a ratcheting mechanism with respect to the threads 104 of the fastener 92. Thus, if a pulling force in the direction of arrow A is urged into the fastener 92, the angled interfaces 102 effectively dig into the threads 104 (and vice versa), thereby resisting the pulling force.

The fastener-engaging members 74 inwardly angle or slant from the main body 72, and may be sized and shaped to wedge or otherwise fit between neighboring threads 104 of the fastener 92. When the fastener-engaging members 74 are positioned between threads 104, the fastener-engaging members 74 provide a secure connection with the fastener 92. As the fastener 92 continues to threadably engage the retainer 70, the fastener-engaging members 74 flex over the threads 104, and snap into spaces between the threads 104, thereby providing a ratcheting mechanism.

The outwardly-directed limiter-engaging members 76 are configured to snapably engage protuberances 106 of the limiting members 94a and 94b during assembly, similar as described above. The outwardly-directed limiter-engaging members 76 abut into the limiting members 94a and 94b, thereby providing a retaining force. The protuberances 106 provide barriers past which the outwardly-directed limiter engaging members 76 are blocked from passing (during normal operation of the assembly 90). The shaft 100 of the fastener 92 may minimize or eliminate flexing movement of the limiter-engaging members 76 when the fastener 92 is retained by the retainer 70.

The outwardly-directed limiter-engaging members 76 may include a flat surface 110 that may be generally parallel to engagement surfaces 112 of the protuberances 106. The engagement surfaces 112 may form flat ledges that are parallel to a plane of a collar 111 of each limiting member 94a and 94b. The collars 111 may be perpendicular to inboard walls 113 extending therefrom. As shown in FIG. 8, the engagement surfaces 112 may provide flat, horizontal ledges. The generally flat surfaces 110 provide increased surface area to engage the engagement surfaces 112, thereby providing a strong interface therebetween. The engagement forces exerted between the flat surfaces 110 and the flat engagement surfaces may be normal to one another, thereby providing a strong engaging connection.

Embodiments provide a retainer that is configured to retain or otherwise capture two limiting members, such as compression limiters, and securely retain a separate and distinct fastener. Embodiments provide a retainer that may secure to limiting members through a snap-fit.

In contrast to known retainers, the embodiments provide a retainer that may securely retain or capture three separate and distinct components. Additionally, in contrast to known retainers, the embodiments provide a retainer that secures to limiting members through a strong, snap-fit, as opposed to a press fit.

While various spatial and directional terms, such as top, bottom, lower, mid, lateral, horizontal, vertical, front and the like may be used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the embodiments disclosed and defined herein extend to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A retainer configured to securely retain a fastener and first and second limiting members, the retainer comprising:
a main body;
fastener-engaging members extending from the main body, wherein the fastener-engaging members are configured to securely engage a portion of the fastener; and
limiter-engaging members extending from the main body, wherein the limiter-engaging members are configured to securely engage portions of the first and second limiting members, wherein outer surfaces of the limiter-engaging members outwardly and radially extend past the fastener-engaging members, wherein the limiter-engaging members comprise first and second rims, wherein the first rim comprises a first rim segment that bridges first and second fastener-engaging walls, and wherein the second rim comprises a second rim segment that bridges third and fourth fastener-engaging walls,
wherein the fastener-engaging members and the limiter-engaging members are configured to retain the fastener and the first and second limiting members.

2. The retainer of claim 1, wherein the fastener-engaging members comprise fastener-engaging walls between terminal ends of the main body.

3. The retainer of claim 1, wherein the first and second rims extend from respective terminal ends of the main body.

4. The retainer of claim 1, wherein the main body comprises one or more slots, wherein the one or more slots provide flexibility to the retainer.

5. The retainer of claim 1, wherein a plurality of slots extend from the first and second rims into the main body.

6. A fastener assembly configured to secure to a component, the fastener assembly comprising:
a fastener having a head and a shaft;
first and second limiting members, wherein each of the first and second limiting members comprises at least one inwardly-directed protuberance; and
a single retainer configured to securely retain the fastener and the first and second limiting members together, the retainer comprising:
a main body, wherein the main body comprises one or more slots, wherein the one or more slots provide flexibility to the retainer, wherein the one or more slots comprise: (a) a first slot formed through a first rim at a first end of the main body, wherein the first rim comprises a first rim segment that bridges first and second fastener-engaging walls, wherein the first slot extends towards a second rim at a second end of the main body, wherein the second rim comprises a second rim segment that bridges third and fourth fastener-engaging walls, and (b) a second slot formed through the second rim at a second end of the main body, wherein the second slot extends towards the first rim at the first end of the main body;
fastener-engaging members extending from the main body, wherein the fastener-engaging members are configured to securely engage a portion of the fastener; and
limiter-engaging members extending from the main body, wherein the limiter-engaging members are configured to securely engage the inwardly-directed protuberances of the first and second limiting members, wherein the fastener-engaging members and the limiter-engaging members are configured to retain the fastener and the first and second limiting members together.

7. The fastener assembly of claim 6, wherein the fastener-engaging members comprise fastener-engaging walls between terminal ends of the main body.

8. The fastener assembly of claim 6, wherein the fastener-engaging members comprise inwardly-directed prongs extending from terminal ends of the main body, wherein the inwardly-directed prongs are configured to wedge between threads of the fastener, and wherein the inwardly-directed prongs provide a ratcheting mechanism with respect to the fastener.

9. The fastener assembly of claim 6, wherein the limiter-engaging members comprise outwardly-extending rims extending from terminal ends of the main body.

10. The fastener assembly of claim 6, wherein the limiter-engaging members comprise outwardly-extending prongs extending from terminal ends of the main body.

11. The fastener assembly of claim 6, wherein the at least one inwardly-directed protuberance is parallel to a collar of the first and second limiting members.

12. A retainer configured to securely retain a fastener and first and second limiting members, the retainer comprising:
  a main body;
  fastener-engaging members extending from the main body, wherein the fastener-engaging members are configured to securely engage a portion of the fastener; and
  limiter-engaging members extending from the main body, wherein the limiter-engaging members are configured to securely engage portions of the first and second limiting members, wherein outer surfaces of the limiter-engaging members outwardly and radially extend past the fastener-engaging members, wherein the limiter-engaging members comprises first and second rims, and wherein the main body comprises one or more slots, wherein the one or more slots provide flexibility to the retainer, wherein the one or more slots comprise: (a) a first slot formed through the first rim at a first end of the main body, wherein the first rim comprises a first rim segment that bridges first and second fastener-engaging walls, wherein the first slot extends towards the second rim at a second end of the main body, wherein the second rim comprises a second rim segment that bridges third and fourth fastener-engaging walls; and (b) a second slot formed through the second rim at a second end of the main body, wherein the second slot extends towards the first rim at the first end of the main body,
wherein the fastener-engaging members and the limiter-engaging members are configured to retain the fastener and the first and second limiting members.

* * * * *